(12) United States Patent  (10) Patent No.: US 9,300,418 B2
Van Dijk et al.  (45) Date of Patent: Mar. 29, 2016

(54) ELECTRONIC LOCATING SYSTEM

(75) Inventors: Jeroen Martin Van Dijk, Enschede (NL); Derk Jan Roosenboom, Haaksbergen (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 228 days.

(21) Appl. No.: 13/989,899

(22) PCT Filed: Nov. 28, 2011

(86) PCT No.: PCT/NL2011/050808
§ 371 (c)(1),
(2), (4) Date: Aug. 16, 2013

(87) PCT Pub. No.: WO2012/074387
PCT Pub. Date: Jun. 7, 2012

(65) Prior Publication Data
US 2013/0316753 A1  Nov. 28, 2013

(30) Foreign Application Priority Data
Nov. 29, 2010  (NL) ..................................... 2005776

(51) Int. Cl.
H04W 24/00 (2009.01)
H04H 60/51 (2008.01)
A01K 11/00 (2006.01)
G01S 5/00 (2006.01)

(52) U.S. Cl.
CPC .............. *H04H 60/51* (2013.01); *A01K 11/006* (2013.01); *G01S 5/00* (2013.01); *G01S 5/0036* (2013.01)

(58) Field of Classification Search
USPC .................. 455/550.1, 456.1–456.6, 457, 455/41.1–41.3
See application file for complete search history.

(56) References Cited

U.S. PATENT DOCUMENTS

| 6,686,881 | B1* | 2/2004 | Lu et al. .................. 342/458 |
| 7,395,966 | B2 | 7/2008 | Braiman |
| 2003/0163037 | A1 | 8/2003 | Bladen et al. |
| 2007/0247366 | A1* | 10/2007 | Smith et al. ............... 342/464 |
| 2007/0299625 | A1* | 12/2007 | Englert et al. ............. 702/150 |
| 2011/0034180 | A1* | 2/2011 | Walley et al. ............ 455/456.1 |
| 2013/0237246 | A1* | 9/2013 | Aggarwal et al. ....... 455/456.1 |

FOREIGN PATENT DOCUMENTS

WO  2008/156416 A1  12/2008

* cited by examiner

*Primary Examiner* — Fayyaz Alam
(74) *Attorney, Agent, or Firm* — Jacobson Holman, PLLC.

(57) ABSTRACT

A method and apparatus for electronically locating and tracking persons, animals, or objects in a predetermined work area utilizing a number of base stations associated with the work area, provided with stationary transmitting-/receiving devices and a number of transponders added to the persons, animals, or objects to be located, provided with transmitting and receiving means, wherein the base stations generate interrogation fields which can be received by the transponders, wherein with the base stations low-frequency magnetic fields with a unique frequency for each base station are generated in the predetermined work area, and wherein transponders are used, which are provided with means to measure the field strength associated with each separate received frequency at the location of the transponder and then to transmit this as a position signal via high-frequency transmitting means of the transponder to high-frequency receiving means provided in the base stations.

24 Claims, 4 Drawing Sheets

ELECTRONIC LOCATING SYSTEM

This is a national stage of PCT/NL11/050808 filed Nov. 28, 2011 and published in English, which has a priority of The Netherlands no. 2005776 filed Nov. 29, 2010, hereby incorporated by reference.

This invention relates to a method for electronically locating and tracking persons, animals or objects in a predetermined work area, utilizing a number of base stations associated with the work area, provided with stationary transmitting and receiving devices and a number of transponders added to the persons, animals or objects to be located, provided with transmitting and receiving means, wherein in operation each base station generates in the work area a reference field which can be received by the transponders, and wherein each transponder is provided with means to measure the field strength of reference fields generated by the base stations at the location of the transponder and to transmit a signal representing the measured field strength together with an identification code for the respective transponder as a position signal to receiving means provided in the base stations. The invention further relates to an electronic apparatus for use of the method.

Locating systems are known in different embodiments. In U.S. Pat. No. 7,395,966 B2 (Parelec Israel) a system is described for locating cows in an enclosed space, with each cow wearing a transponder. The transponders in operation receive high-frequency radio signals in the 433 MHz band or the 846 MHz band, which are emitted by a stationary transmitting antenna. In response to the high-frequency radio signal the transponders transmit an optical signal with a predetermined light color in a preprogrammed time slot. Utilizing video cameras, images of the enclosed space with the cows are made, on which the different light signals emitted by the transponders can be seen. Utilizing these pictures, the individual cows can be located and tracked on the basis of the optical signals emitted by their transponders.

WO 2008/156416 A1 (DeLaval) describes an apparatus for positioning and tracking animals, such as cows, in a farm environment. Each animal is provided with a transponder, which can wirelessly receive signals from one of a number of stationary base stations. The transponders transmit signals, which contain information about the respective base station, about the identity of the transponder (and hence of the animal wearing the transponder) and about the time of transmission. The signals transmitted by the transponders are received by a stationary receiver. On the basis of these signals it can be determined at what time an animal was in an area around one of the base stations. The transmission ranges of the base stations are smaller than a half of the distances between the base stations. In this way, therefore, only a rough positioning of an animal is possible.

Different drawbacks are inherent to the known locating systems. Thus, optical signaling means are sensitive to pollution. Also, an optical signaling is only possible if the optical signal source and the receiver of the optical signals can "see" each other. Obstacles make for reflections or stop the optical signals altogether.

Also for the conventionally used high-frequency radio signals it holds that these are reflected and/or stopped by obstacles. An animal provided with a transponder standing behind another animal or some wall or the like, then cannot, or cannot properly, be detected.

From U.S. Pat. No. 6,686,881 B1 (Lu) a method and apparatus of the type described in the preamble are known for tracking assets and/or products, wherein the base stations generate magnetic reference fields, which have a strength varying according to a predetermined modulation, The transponders are configured to transmit a position signal to the base stations, as soon as the intensity of a magnetic field at the location of a transponder exceeds a predetermined threshold level. The moment at which the threshold level is exceeded is a measure of the distance between a base station and the transponder. The base stations all generate a magnetic field with the same base frequency. To be able to discriminate between the different base stations, they can be switched on and off alternately according to a multiplexing method. Also, whether or not in combination with this, a different modulation frequency for each base station may be used. In addition, several threshold levels may be utilized.

U.S. Pat. No. 6,686,881 B1 (Lu) also describes a method and apparatus whereby the base stations generate a non-varying magnetic field. In that case, the base stations can be distinguished from each other in that they are switched on and off alternately.

A drawback of the technology described in U.S. Pat. No. 6,686,881 B1 (Lu) is that it requires relatively complicated electronics to be able to distinguish between the different base stations to be distinguished and that the field strength measurements by the transponders are inaccurate in cases where the transponders can assume different orientations with respect to the field lines of the reference fields.

The invention contemplates obviating the drawbacks outlined and more generally making available an improved, reliably and accurately working method and apparatus for locating and tracking persons, animals or objects.

To this end, according to the invention, a method of the above-described kind is characterized in that with the base stations low-frequency magnetic fields are transmitted with a unique frequency for each base station; that the receiving means of the transponders are configured to receive the X, Y, and Z components of each of the field frequencies; and that the transmitting means of the transponders comprise an ultra-high frequency (UHF) transmitter.

An electronic locating apparatus is characterized, according to the invention, in that the base stations are configured to generate in the work area low-frequency magnetic fields with a unique frequency for each base station, and that the receiving means of the transponders are configured to receive the X, Y, and Z components of each of the transmission frequencies.

It is noted that the term "object" in the context of this description is understood to mean anything that is not a human being or animal. An object may therefore be, for example, a machine or a vehicle, but also a (shop) article or other kind of object.

In the following the invention is described in more detail with reference to the appended drawing.

Figure 1:
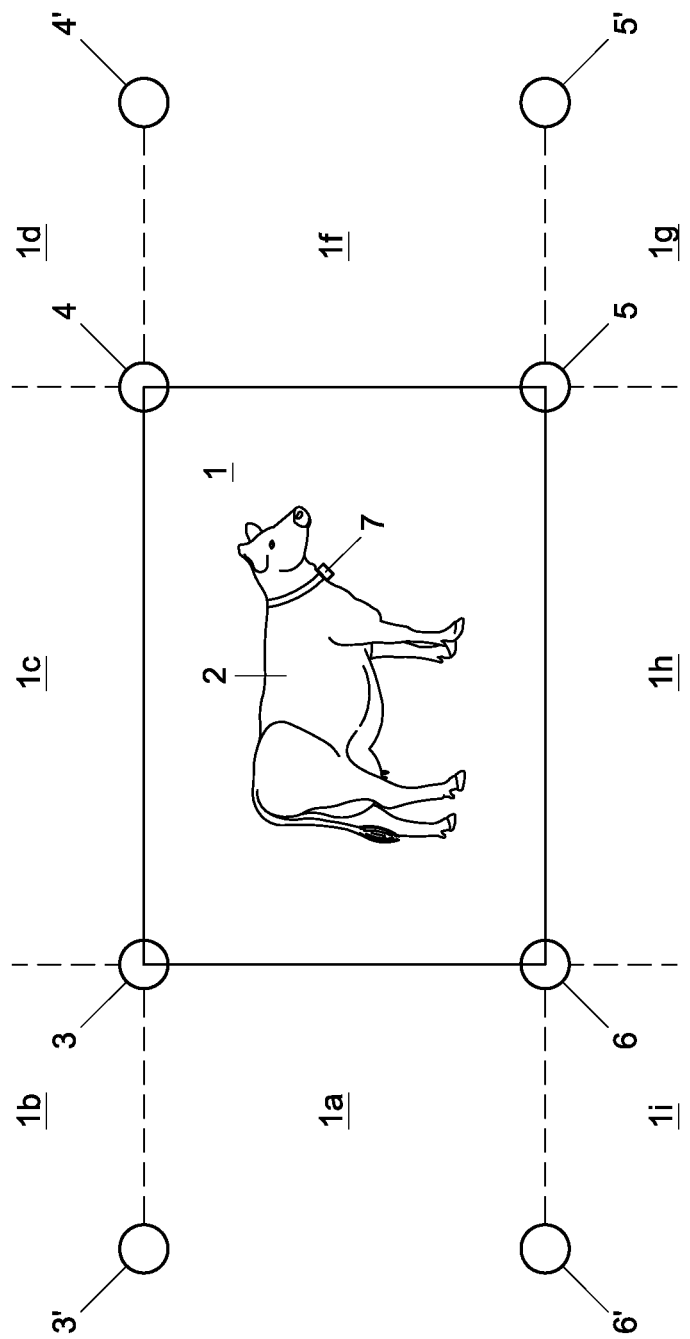
FIG. 1 shows schematically an example of a plan of a space where cows can move freely.

FIG. 1 shows schematically an example of a plan of an area or space 1 where animals, in this example cows, can move freely. By way of example, a cow is indicated at 2. The space 1 can be a (part of a) shed or barn, but may also be an outdoor terrain. In the example shown, the space 1 is rectangular, but any circumferential shape is possible. In the example of FIG. 1, four base stations 3, 4, 5, and 6 provided with transmitting/receiving devices are shown. The base stations are sometimes referred to as beacons. Furthermore, the cow 2 wears a schematically indicated transponder 7.

In the example shown, the transponder is attached around the neck of the cow, but the invention is independent of the chosen place of attachment or method of attachment. In the case of a person, the transponder may be worn, for example, in or on the clothes or a bag, or, for example, on the wrist. Objects may be provided with a transponder in numerous ways. According to the invention, the base stations each transmit a magnetic detection field, also referred to as reference field, with its own unique low frequency. The frequencies used are chosen such that the space 1 is in the so-called near field. Such low-frequency signals, unlike the usual high-frequency signals, are attenuated by obstacles only to a slight extent and do not form any interfering reflections. Nor is any free line of sight needed between the base stations and the transponders. A cow standing in the "shadow" of another cow or behind some wall or the like can still be detected with low-frequency signals. In a practical exemplary embodiment, the frequencies used may be around 50 kHz. The respective base stations 3, 4, 5, 6 can transmit magnetic fields of, for example 48 kHz, 49 kHz, 50 kHz and 51 kHz. In general, in view of the applicable regulations for allowable field strengths for inductive systems, operating frequencies in the range between approximately 30 kHz and approximately 70 kHz are desirable.

The transponders 7 are provided with a receiver, which is configured to receive the low-frequency signals and to measure the strength thereof. The signal strength is a measure of the distance between the transponder and the transmitter. As soon as a transponder receives three or more signals, the position of the transponder with respect to the base stations can be simply calculated utilizing known mathematical methods, such as, for example, trilateration. The transponders are furthermore provided with a UHF transmitter, which transmits the high-frequency signals representing the measured field strengths. The high-frequency signals transmitted by the transponders are received by UHF receivers present in the base stations. On the basis of these signals, in a manner described hereinbelow, the position of a transponder can be calculated. The problem of blocking or reflection of the UHF signals by obstacles is obviated in a manner described hereinbelow.

Figure 2:
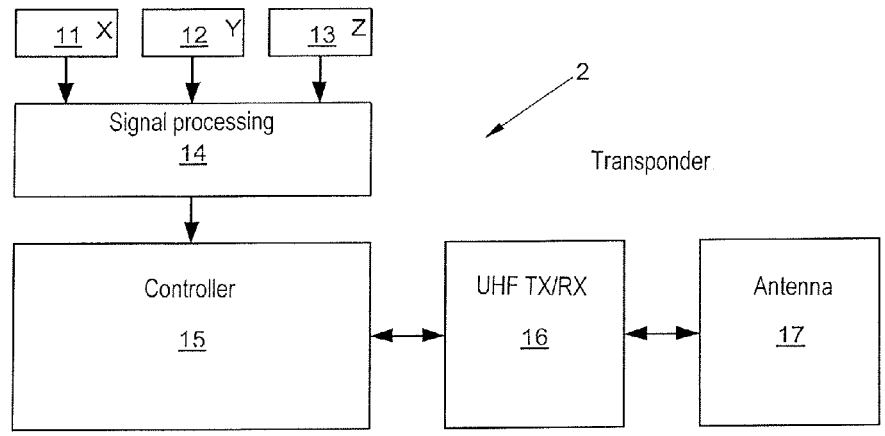
FIG. 2 shows an electrical block diagram of an example of a transponder according to the invention.

FIG. 2 shows an example of an electrical block diagram of a transponder 7. The transponder has preferably, and also in this example, three receiving channels 11, 12, 13, whose antenna coils X, Y, Z are perpendicular to each other. As a result, the signals transmitted by the base stations can be received well, independently of the orientation of the transponder—and hence independently of the attitude of the cow. The receiving channels 11, 12, and 13 are connected with a signal processing circuit 14, which filters the signals from the receiving channels with narrow-band filters corresponding to the unique low frequencies transmitted by the base stations. The filters may also be placed in the receiving channels.

Of the thus obtained X, Y, and Z components of the transmission frequencies of the base stations, the strength is measured in the signal processing circuit 14. Next, in the signal processing circuit 14, for each of the received transmission frequencies, the absolute value of the H vector, that is, of the magnetic field strength belonging to the respective transmission frequency, is determined from the X, Y, and Z components. This value of the H vector, unlike the value of the components X, Y, and Z, is independent of the orientation of the transponder.

In this manner the magnetic field strength H is determined for each of the transmission frequencies at the location of the respective transponder. The magnetic field strength H at the location of a transponder calculated for a particular frequency is a measure of the distance of that transponder to the base station that transmits the respective frequency. Since each base station utilizes an own unique frequency and moreover each base station has a known fixed location, the position of a transponder can be calculated, as soon as the signal processing circuit 14 has determined the value of the vector H of each of the magnetic fields transmitted by at least three base stations.

A module 15 connected with the signal processing circuit 14 comprises a control device, such as, for example, a microcontroller, which controls all signal processing processes. The microcontroller also controls a UHF transmitter/receiver 16, which is connected with an antenna 17.

The UHF transceiver 16, under the control of the microcontroller or the like, periodically transmits high-frequency signals representing the field strength at the location of the transponder together with an identification code for the respective transponder. The respective position signals are captured by UHF transceivers, which are present in each of the base stations. The base stations are mutually connected. Possible problems of blocking and/or reflections of the high-frequency signals are obviated in that only one of the base stations needs to receive a correct UHF signal from a transponder. The chances of this are sufficiently great. This signal is utilized to calculate the position of this transponder.

It is noted that it is known per se in RFID (Radio Frequency Identification) systems to utilize the field strength as a measure of the distance between a transmitter and a receiver, see, e.g., EP 1708375 A1 (LSI), EP 2 091 003 A1 (Toshiba), WO 2010/013215 A1 (NXP). These known systems, however, merely determine the distance between a transponder and an interrogation unit and not the position of the transponder.

Also, it is known per se to utilize antennas with several dimensions, as described, e.g., in WO 97/07414 (Tetra Laval). These known multidimensional antennas, however, are utilized to determine from what direction a received signal is coming and then to use that portion of the multidimensional antenna that matches this direction best.

Figure 3:
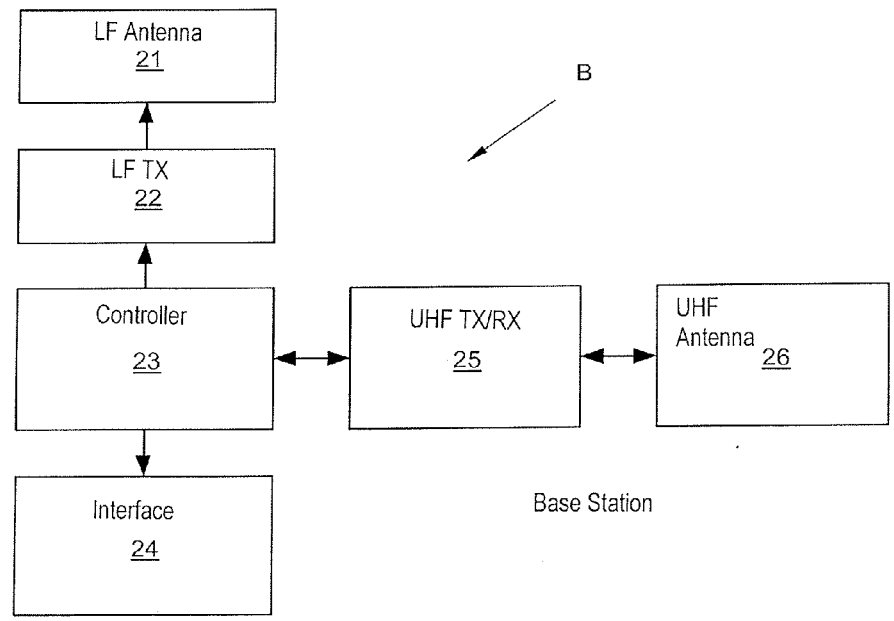
FIG. 3 shows an electrical block diagram of an example of a base station according to the invention.

FIG. 3 shows an example of an electrical block diagram of a stationary base station B according to the invention corresponding to the base stations indicated in FIG. 1. In the example shown, the base station B comprises a low-frequency (LF) transmitting antenna 21, an LF transmitter 22 and a central control device 23, which can comprise, for example, a microcontroller. The LF transmitter 22 generates a low-frequency signal, for example in the frequency range around 50 kHz, associated with the respective base station. This signal is radiated by the LF antenna in the space 1. As mentioned earlier, each base station has an individual transmission frequency associated with it, differing from the transmission frequencies of the other base stations. The LF signals are preferably continuously transmitted by the base stations. In principle, this may also be done intermittently, but that would require synchronization of the base stations, making the system less simple and also slower. Also, during the measurement in the transponders which takes some time, the signal needs to be stable, which is not always the case with intermittent signals.

Figure 6:
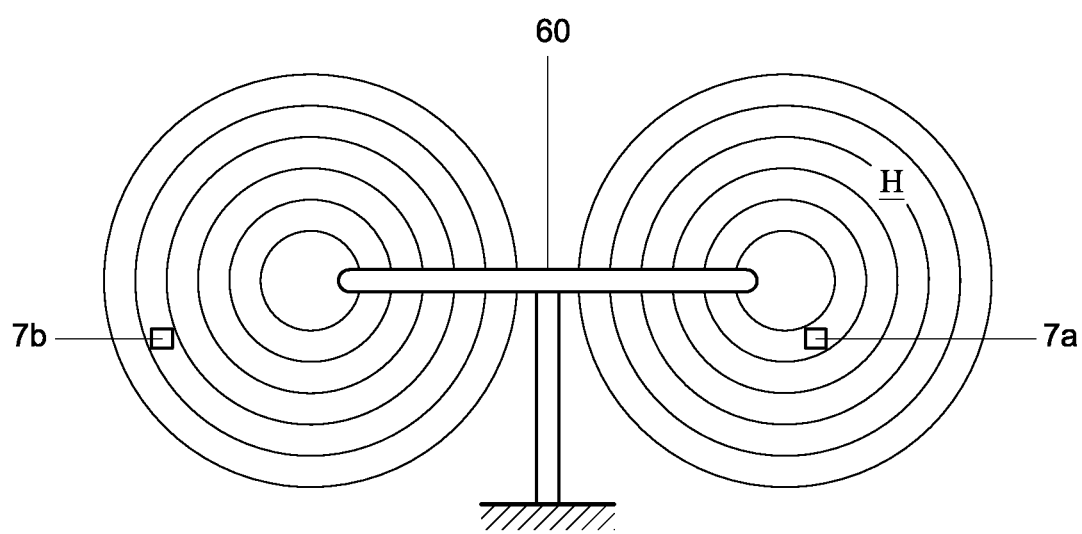
FIG. 6 shows schematically a side elevational view of an example of a transmission coil applicable in a base station.

The LF antenna 21 preferably comprises a substantially horizontally lying, substantially planar loop-shaped antenna coil 60, which in this example is placed on a base 61, as schematically shown in side elevational view in FIG. 6. The magnetic field H around the antenna coil is then circularly symmetrical in the horizontal plane, where the cows provided with a transponder 7a, 7b are walking. The magnetic field strength then depends solely on the distance to the antenna of the base station and not, for example, on the direction of the connecting line between a transponder and the transmitting coil. In this horizontal plane the magnetic field is always directed vertically. At some distance from the antenna coil the field strength in the near field decreases proportionally to the third power of the distance. To make a feasible distance of, for example, 50 meters possible, the antenna should accordingly have a strong transmitting signal available. Partly owing to the fact that a locating system according to the invention can be simply scaled up by adding base stations to obtain a larger working area, an effective range of 50 meters per base station is sufficient in most practical situations. In FIG. 1 broken lines schematically indicate possible expansion areas 1a through 1i of the space 1 with a few associated base stations 3', 4', 5', 6'. The added base stations should be distinct from the original base stations 3 through 6 by their own unique low-frequency transmission signals. On the other hand, for base stations that are sufficiently far removed from each other, if desired, the same transmission frequency can be used.

The central control device 23 controls the transmitter 22 and receives UHF signals from a UHF transceiver 25, which is provided with a UHF transmitting/receiving antenna 26. The UHF transceiver 25 in operation receives UHF signals transmitted by the transponders, as described above, which represent the field strengths at the position of the transponders and contain the identification codes of the transponders.

Between the transponders and the base stations, therefore, a UHF link exists. These received UHF signals are supplied, under control of the control device 23, to a serial interface 24, with which the base stations are mutually coupled. The serial interface 24 can take the form, for example, of a so-called CAN (Controller Area Network) bus.

In the UHF protocol a fault detection is provided. Only signals that are faultlessly received by a base station are used. On the basis of one of those signals the position of the transponder that transmitted the respective signal is calculated. For this purpose, the strongest signal can be used, but this is not requisite. It is possible, if desired, to perform a check by additionally calculating the position on the basis of one or more other faultlessly received signals.

Figure 4:
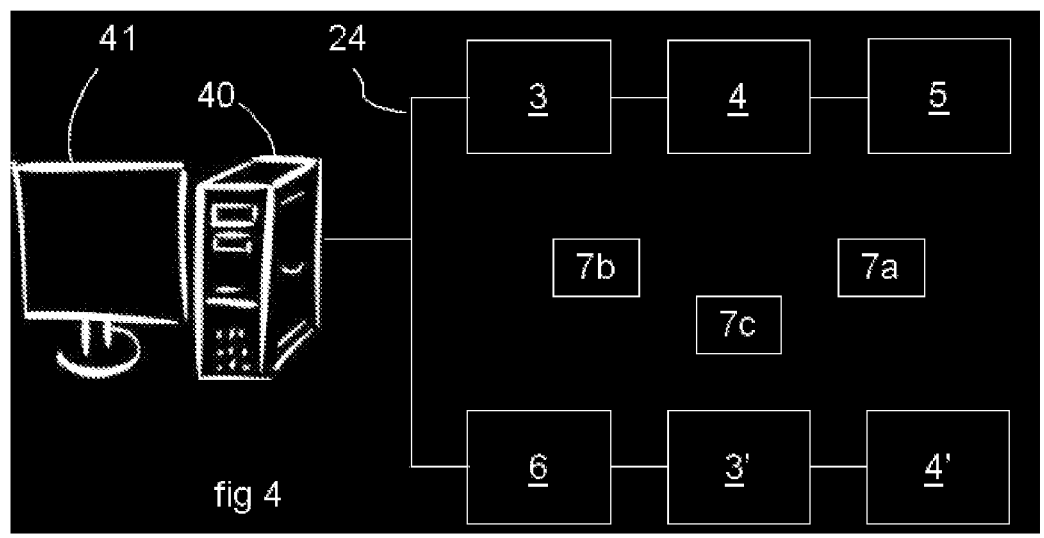
FIG. 4 shows an electrical block diagram of an example of a system according to the invention.

The positions of the transponders can be calculated in the base stations or in a central computer, as shown at 40 in FIG. 4.

In the foregoing it has been assumed that the transponders are configured to measure the strengths of three mutually perpendicular field components X, Y, Z of each of the received magnetic fields, and to calculate therefrom the field strength H of the magnetic field. It is also possible, however, to transmit signals that represent the separate field components X, Y and Z via the UHF link to the base stations and to carry out the calculation of the field strength H in the base stations or a central computer.

The base stations B can also communicate via the UHF link with the transponders 7. That purpose is served by the receiving function of the UHF transmitter/receiver 16 of the transponders. The base stations can, for instance, send setting signals to the transponders via the UHF link. The setting signals can, for instance, serve to determine the periodicity with which the transponders are activated to determine the field strength at their position and to transmit the signals relating thereto via the UHF link to the base stations. In the case of locating and tracking cows, it would expectably be sufficient, for example, if the transponders are activated some ten times per minute.

The UHF link may also, if desired, be used to transmit still other information than information relating to the position and identity of an animal or to take care of the initial activation of the transponders. Such other information can concern, for example, the nature or condition of the animal.

Cows are often provided with activity detectors, also referred to as step counters, which provide information about the mobility of the cow. That information in turn allows conclusions to be drawn about the condition of the cow regarding health or heat. The current step counters are usually read out along with identification information of a cow during feeding and/or milking of the cow. This, however, is only the case a few times a day, and even then only when in fact milking is done and/or food concentrate is dispensed. When the above-described transponder is combined with a step counter, however, it is possible to read out the step counter far more frequently. Moreover, the step counters can then be used also for animals that are not milked and/or that do not present at the automatic feeder or animals that are not given any concentrate, as is sometimes the case with young stock. The information of a step counter can then together with position signals relating to the field strengths at the location of the cow be transmitted via the UHF link.

FIG. 4 shows schematically an example of a setup of a number of base stations 3, 4, 5, 6, 3' and 4' according to the invention, which, via a serial connection such as, for example, a CAN bus 24, are connected with a central computer 40 with display 41. In the area covered by the base stations there are schematically indicated transponders 7a, 7b, 7c. Each transponder can receive magnetic fields transmitted by the base stations and measure therefrom, in the manner already described, the strength of the magnetic fields of the separate base stations at the location of the transponder, that is, as far as the transponder is within the range of the separate base stations. Signals representing the strength of the magnetic fields of at least three different base stations are wirelessly transmitted by the transponder via its UHF link to all base stations that are within the transmission range of the UHF transmitter/receiver 16 of the transponder. These signals are supplied via the serial connection 24 to the central computer 40. The readiest signal is used to calculate the position of the transponder in a base station or in the computer 40. For "tracking and tracing" purposes this process is periodically repeated. For cows, positioning could take place, for example, 10 times a minute. Utilizing the thus determined successive positions, the moves of a cow can be recorded and, if desired, be graphically represented. This information gives an impression of the activity level of the cow. The activity level is associated with the condition of the cow. Further information may be obtained utilizing other sensors, which can detect parameters related to the wearer (person, animal or object) and which may or may not be integrated in the transponder. Thus, the transponder, when used for cows, may be provided with, for example, a thermometer, which measures the temperature of the cow. Also, the transponder may be provided with a step counter, as described hereinbefore. Such step counters can contain, for example, G sensors, known per se, which measure acceleration changes and are very low-energy. G sensors are already mass-produced for applications in cameras and the like and are simple to integrate into a transponder.

The step counter indicates whether the cow during its moves has actually moved a lot or has only walked around calmly. However, the cow's activity is also apparent if the position is accurately monitored. All this information is of importance to the stock farmer and, if desired, can also be forwarded by the transponder via the UHF link to the base stations and hence to the central computer 40.

If the stock farmer, whether or not on the basis of the information obtained via the central computer 40, wishes to inspect an individual cow, it is of importance to be able to trace a specific cow in a group of cows.

FIG. 5 again shows schematically a space 1 in which there are animals, such as cows. If a stock farmer 50 wishes to trace a particular cow from the herd in the space 1, he can utilize a tracing device 51. The tracing device is then provided with a similar receiving device and signal processing device as the transponders. The tracing device may be configured to calculate the own position. The tracing device furthermore has at least one UHF receiver, via which signals representing the measured field strength, transmitted by the transponder of the target cow, can be received, via a base station or not so. From these signals, the tracing device can determine the position of the target cow. Alternatively, the tracing device could utilize the position of the target cow calculated by a base station or the central computer. On the basis of the own position and that of the target cow, the distance to the cow and also the direction to the cow are calculated. This last, however, could also take place in the central computer. In that case, the tracing device 51 also needs a UHF transmitting section.

Alternatively, the tracing device may be configured to measure only the field strength at the location of the tracing device and to transmit position signals corresponding thereto. The own position is then calculated in a base station or a central computer and transmitted via the UHF connection to the tracing device. The distance to the cow and the direction towards the cow can then be calculated by the tracing device or by a central computer again.

Figure 5:
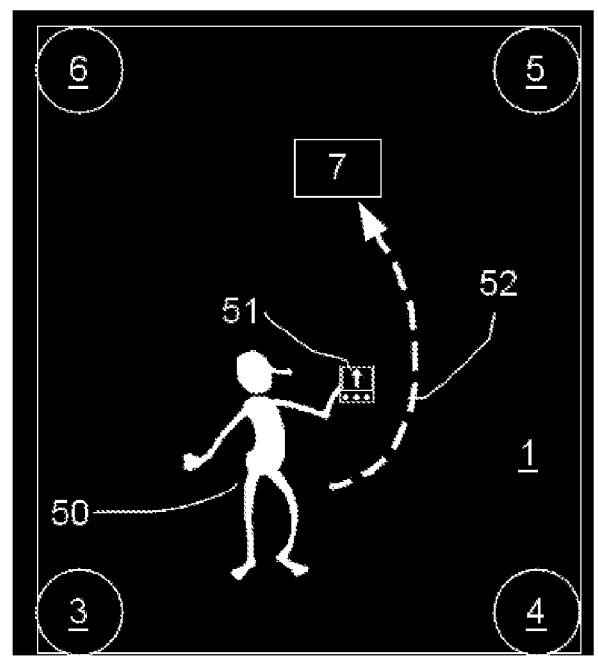
FIG. 5 illustrates schematically the manner in which a user can trace an individual animal in a group of animals.

The user of the tracing device may be guided to the target cow, as indicated with an arrow 52, by means of customary signals, for example, by an arrow on a display and/or beeps. FIG. 5 only shows a transponder 7 worn by a cow, though not the cow itself. The user can, in principle, identify the target cow by the appearance of the cow or, for example, by the information provided on an earmark and/or a collar. It is also possible to provide the cow, or the transponder, with an activatable signal lamp, such as a LED lamp or other visible and/or audible signaling device.

As already noted, a locating method and locating system, respectively, is generally applicable for locating and tracking animals, objects or persons. To be considered in the case of animals, besides cows, are, for example, animals in a zoo, horses, pigs, etc. To be considered in the case of objects are, for example, articles in a production process, but also, for example, suitcases in a luggage handling hall or the like.

Owing to the utilization, according to the invention, of low-frequency detection fields, which pass through animals and people with no or very little attenuation, and can also easily pass walls of buildings, at least, if these do not contain too much iron or other ferromagnetic materials and/or current loops, a locating method and locating system according to the invention are also properly applicable within buildings.

For objects, the application in a production environment or a luggage handling hall or the like has already been mentioned. Also persons who are in a building can be located with a system according to the invention. Thus, for example, visitors of a building may be issued a transponder. If a visitor is lost, he can then be located. Also, it may be important, for instance, to be able to trace persons in a skiing area. In practice, furthermore, there appears to be an interest in a possibility of tracing pupils in a school building. There too, the present invention is applicable.

Locating objects or persons in a building, as opposed to the situation in a stock farm, often involves a three-dimensional environment in which the persons or objects may be at several levels. In such a situation each level, for example, each floor of a building, may be provided with an associated array of base stations. The base stations of a floor may either be coupled with a specific central computer operative for that floor or may, together with the base stations of one or more or even all other floors, be coupled with a single central computer.

If a building involves physical floors incorporating reinforced concrete, the magnetic fields of a floor are effective substantially on that floor alone and on each floor there is a two-dimensional situation.

In buildings in which the physical floors constitute no shielding or a low shielding for magnetic fields, a transponder can receive LF signals from base stations arranged at different floors. The transponders and the transmitting coils that transmit LF signals to be received by the transponders then are not substantially in the same plane anymore. In that case, in positioning, the angle between the connecting line of transponder and the center of the transmitting coil on the one hand and the plane of the transmitting coil on the other also plays a role. The calculation of the position of a transponder on the basis of the measured magnetic field strength in a three-dimensional situation is more complex than in the case of a two-dimensional situation. In the three-dimensional space the points with a constant magnetic field strength in the near field around a planar transmitting coil form a kind of doughnut shape. Given a minimum of four different transmitting coils, an unequivocal point of intersection of the different "doughnuts" is obtained which each represent a measured field strength of one of the transmitters. That point of intersection then corresponds to the transponder position. Calculating such an intersection may be carried out utilizing iterative procedures, known per se, starting from an estimated transponder position. For the estimated position, the associated field strengths of the different transmitters from which the transponder has received LF signals are calculated.

On the basis of the differences with the measured field strengths, a corrected estimate of the positions is determined. This is repeated until the difference between the measured field strengths and the calculated field strength belonging to the estimated position is sufficiently small. The last estimated position is then accepted as the real position of the transponder.

It is noted that in such a system the transmitting coils do not, or do not all of them, need to be placed horizontally, provided that the real orientation is known.

It is noted furthermore that by the use of a number of base stations with horizontal transmitting coils per floor or level, where no physical floors are present that form a magnetic shielding, the above-described three-dimensional calculations can be avoided by separating the levels virtually. This is possible by configuring the transponders to discriminate between interrogation fields belonging to different levels and to carry out the position calculations based on information about the respective level and the field strengths at the location of a transponder as generated by base stations belonging exclusively to that level. Information about the field frequencies used at each level may be stored in the transponders.

The transponders, also variously designated as tags, responders, labels, detection plates, sensors, etc., contain, as will be apparent from the foregoing, active circuits which need a supply voltage. The supply voltage may be furnished by a battery. Since the transponders do not need to transmit continuously (via the UHF link), the energy consumption of the transponders is only small. This means that with the conventional batteries, an effective life of five years or more is possible.

It is noted that after the foregoing, various modifications will readily occur to those skilled in the art. Thus, if desired, it is possible to carry out the position calculation in the transponders themselves. However, this makes the transponders more complicated and less energy-saving. Also, in that case, information about the positions of the base stations would need to be stored in the transponders or sent to them. Furthermore, the connection 24 between the base stations can be both a wired and a wireless connection or a combination of the two. These and other modifications are understood to be within the purview of the invention as claimed in the appended claims.

The invention claimed is:

1. A method for electronically locating and tracking persons, animals or objects in a predetermined work area utilizing a number of base stations associated with said work area, provided with stationary transmitting and receiving devices and a number of transponders added to the persons, animals or objects to be located, provided with transmitting and receiving means, wherein in operation each base station generates in the work area a reference field which can be received by the transponders, and wherein each transponder is provided with means to measure the field strength of reference fields generated by the base stations at the location of the transponder and to transmit a signal representing the measured field strength together with an identification code for the respective transponder as a position signal to receiving means provided in the base stations, wherein with the base stations by means of substantially horizontal oriented and substantially planar loop shaped coils low-frequency magnetic fields are transmitted with a unique single unmodulated frequency for each base station; wherein the receiving means of the transponders are configured to receive the X, Y, and Z components of each of the field frequencies; and wherein the transmitting means of the transponders comprise an ultra-high frequency (UHF) transmitter; wherein position signal transmitted by a transponder represents field strengths of a number of magnetic fields at a location of the transponder and the position of the transponder is calculated on the basis of these signals in a base station or in a central computer connected with the base stations; and wherein the work area extends within the near field of the applied frequencies of the low-frequency magnetic fields.

2. The method according to claim 1, wherein interconnected base stations are used and that at least one position signal faultlessly received by the base stations from a transponder is used to record the position of the transponder.

3. The method according to claim 2, wherein the transponders are configured to calculate their own position on the basis of the measured field strengths, and wherein the transmitted position signal represents this position.

4. The method according to claim 1, wherein the applied frequencies of the low-frequency magnetic fields are in the range between substantially 30 kHz and 70 kHz, more particularly in the neighborhood of 50 kHz.

5. The method according to claim 1, wherein said work area comprises a three-dimensional space in which the persons, animals, or objects may be situated at different levels, and wherein the transponders are configured to measure the field strengths associated with base stations at different levels at the location of the transponder, and on the basis of the measured field strengths of at least four base stations to generate a position signal and transmit this via the UHF transmitting means.

6. The method according to claim 5, wherein said work area comprises a three-dimensional space, in which the persons, animals or objects can be at different levels, wherein the levels are magnetically or virtually separated from each other, wherein the base stations have horizontally oriented transmitting coils, and wherein transponders are used which on the basis of the measured field strengths of three or more base stations can generate position signals on the basis of which the position at the respective level is calculated.

7. The method according to claim 1, wherein the work area has only a single level at which the persons, animals, or objects may be situated.

8. The method according to claim 1, wherein transponders are used with three mutually perpendicularly oriented LF antenna coils for receiving three mutually perpendicular magnetic field components X, Y, and Z, after which on the basis of the strength of the field components X, Y, and Z the absolute value H of the field strength at the location of the transponder is calculated.

9. The method according to claim 1, used for animals, wherein at least a number of animals are provided with one or more sensors, which provide further information about the animals, wherein the transponders are configured to transmit this further information together with position information via said high-frequency transmitting means to high-frequency receiving means of the base stations.

10. The method according to claim 1, wherein the transponders are provided with UHF receiving means, while at least a number of base stations are provided with a UHF transmitting device, which is used to transfer at least setting signals and/or activation signals to said UHF receiving means of a transponder.

11. An apparatus for electronically locating and tracking persons, animals, or objects in a predetermined work area, comprising a number of base stations associated with said work area, provided with stationary transmitting/receiving devices, and a number of transponders added to the persons, animals or objects to be located, provided with transmitting and receiving means, wherein each base station in operation generates a magnetic reference field which can be received by the transponders, wherein each transponder is provided with means to measure for each frequency received by a transponder the field strength of reference fields generated by the base stations at the location of the transponder and to transmit a signal representing the measured field strength together with an identification code for the transponder as a position signal to receiving means provided in the base stations, wherein the base stations are provided with substantially horizontal placed and substantially planar loop shaped transmitting coils and are configured to generate in the work area low-frequency magnetic fields with a unique single unmodulated frequency for each base station, and wherein the receiving means of the transponders are configured to receive the X, Y, and Z components of each of the low-frequency magnetic fields; wherein position signal transmitted by a transponder represents field strengths of a number of magnetic fields at a location of the transponder and the position of the transponder is calculated on the basis of these signals in a base station or in a central computer connected with the base stations; and wherein the work area extends within the near field of the applied frequencies of the low-frequency magnetic fields.

12. The apparatus according to claim 11, wherein the base stations are connected with each other and with a central computer and that at least one position signal faultlessly received by the base stations is used to calculate the position of a transponder.

13. The apparatus according to claim 12, wherein said transponders are provided with UHF transmitting means and the base stations are provided with UHF receiving means and the transponders are configured to transmit the position signals via the UHF transmitting means to said UHF receiving means of said base stations.

14. The apparatus according to claim 11, wherein the position of a transponder is calculated either in a base station or in the central computer.

15. The apparatus according to claim 11, wherein the transponders are provided with means to calculate their own position and that the position signals represent the calculated position.

16. The apparatus according to claim 11, wherein at least a number of base stations are each provided with an UHF transmitting device, which can communicate with corresponding UHF receiving means in the transponders.

17. The apparatus according to claim 11, wherein the transponders are provided with three-dimensional receiving antennas for receiving three mutually perpendicular components of a low-frequency magnetic field, as well as means for calculating from said three components the absolute value of the field strength of the low-frequency field at the location of the transponder.

18. The apparatus according to claim 11, wherein each transponder contains filters with a number of band-pass ranges, which band-pass ranges each correspond with one single low frequency of the unique frequencies transmitted in the work area by the different base stations.

19. The apparatus according to claim 11, wherein the base stations are provided with substantially horizontally placed and substantially planar loop-shaped transmitting antennas and that the transponders have a signal processing device, which is configured to calculate the position of the transponder in the work space on the basis of the absolute value of the field strength of at least three low-frequency magnetic fields with different frequencies.

20. The apparatus according to claim 11, wherein the transponders in the work space may be situated at different levels with different heights with respect to one or more of the base stations, and that the transponders have a signal processing device, which is configured, on the basis of the absolute value of the field strength of at least four low-frequency interrogation fields with different frequencies, to generate a position signal and transmit it via the UHF transmitting means.

21. The apparatus according to claim 11 configured for locating persons, animals, or objects that are situated at one level and provided with a transponder, wherein the base stations are provided with horizontally oriented low-frequency transmitting coils and that each transponder is provided with a three-dimensional low-frequency receiving antenna.

22. The apparatus according to claim 11, wherein at least a number of transponders are provided with at least one integrated sensor for detecting information related to the wearer of the transponder.

23. The transponder designed for use in a method or apparatus according to claim 1 respectively.

24. The base station designed for use in a method or apparatus according to claim 1 respectively.

* * * * *